United States Patent [19]

Busch

[11] Patent Number: 4,592,690

[45] Date of Patent: Jun. 3, 1986

[54] HOT MELT GASKETING COMPOSITIONS AND PROCESSES FOR APPLYING THEM

[75] Inventor: Fred A. Busch, Clementon, N.J.

[73] Assignee: Bonded Products, Inc., West Chester, Pa.

[21] Appl. No.: 695,487

[22] Filed: Jan. 28, 1985

Related U.S. Application Data

[63] Continuation-in-part of Ser. No. 440,100, Oct. 8, 1982, abandoned.

[51] Int. Cl.[4] .............................................. B21D 51/46
[52] U.S. Cl. ........................................ 413/19; 413/60; 413/61; 156/69; 524/575
[58] Field of Search ...................... 156/69; 413/19, 60, 413/61; 524/575

[56] References Cited

U.S. PATENT DOCUMENTS

| | | | |
|---|---|---|---|
| 597,386 | 1/1898 | Brenzinger | 413/60 |
| 1,517,340 | 12/1924 | Bryant | 413/19 |
| 1,578,407 | 3/1926 | Dewey et al. | 413/19 |
| 2,413,449 | 12/1946 | Hatch | 413/19 |
| 3,118,783 | 1/1964 | Nagle et al. | 413/19 |
| 3,344,093 | 9/1967 | Strickman | 413/61 |
| 4,000,836 | 1/1977 | Williams et al. | 524/575 |
| 4,051,096 | 9/1977 | Koseki et al. | 524/502 |
| 4,102,304 | 7/1978 | Debenham | 413/19 |

*Primary Examiner*—Joseph L. Schofer
*Assistant Examiner*—N. Sarofim
*Attorney, Agent, or Firm*—Nelson E. Kimmelman

[57] ABSTRACT

Compositions from 25% to 65% of a synthetic rubber block copolymer and from 75% to 35% plasticizer by weight are heated and mixed and applied, usually with a curing agent, to the lid or cover of a container such as a drum or pail. The application may take place while the lid or cover is revolved and the heated mixture is flowed on. The synthetic rubbers may be of the groups comprising SBS rubber, SIS rubber, S-EB-S rubber. The plasticizer may be from the group comprising paraffin, oils or waxes, polyethylene, polypropylene or ethyl vinyl alcohol.

Apparatus is also shown and described for implementing the application of the compositions to the lid or cover as it is revolved. If a groove is formed in the cover before reception of the composition, the apparatus extrudes or flows it into the groove and then the flowed-in material is permitted to set.

32 Claims, 2 Drawing Figures

HOT MELT GASKETING COMPOSITIONS AND PROCESSES FOR APPLYING THEM

This is a continuation-in-part application of the present inventor's previous application Ser. No. 440,110, filed Oct. 8, 1982, now abandoned, and entitled "Hot Melt Gasketing Compound for Drums and Pails".

BACKGROUND OF THE INVENTION

A. Field of the Invention

The present invention relates generally to the field of gasketing products, compositions and methods, especially to the field of hot-melt, formed-in-place compositions flowed onto containers such as drums and pails made of metal, fiber or plastic.

B. Prior Art

Currently, to provide suitable sealed closures for drums and pails or the like, it is the usual practice to employ conventional plastisol or rubber latex materials. The latter materials require considerable energy (heat) first to remove water from the compositions while they are being prepared and then again when the compositions are cured to form the gasket. Gaskets have also been formed by applying liquid plastisol compositions directly onto lids or closures at room temperature. The lids are then put into an oven at a temperature of about 420° F. for about four minutes. Then, to effect post-cure, they are again subjected to high temperature conditions for a considerable length of time which entails very large energy usage. Both of the last two steps result in heating the lids to hard-to-handle temperatures.

Conventionally, it is also known to provide or insert a previously-formed gasket as a separate item between the open end of the container and its lid or cover. In some instances, the previously-formed gasket is secured to the lid or cover by the use of a suitable adhesive material that is compatible with the gasket material and with the contents stored in the container.

Conventional gaskets often do not have the desirable qualities of the gasket products of the present invention. One quality that is often lacking is high resistance to compression set. This means that the containers presumably closed by such conventional gaskets may in fact be highly susceptible to leaks through the gasket under certain conditions.

Typical gasketing materials that have been employed in the past with varying degrees of success include soft metal such as copper, and numerous resilient non-metallic products including cork, rubber, neoprene and other plastic materials. Such materials have included fluorocarbon polymers, plasticized vinyls, silicone and thermoplastic elastomers.

It is therefore among the objects of the present invention to provide a superior gasket product which:
1. Has excellent slip and flexibility characteristics.
2. Is resistant to exudation of its constituent components such as plasticizing oils or the like.
3. Has high resistance to compression set.
4. Is made of relatively low cost materials.
5. May be made in a relatively low cost process.
6. Is sparing of heat usage during its fabrication.
7. Can be made in a hot-melt application directly onto the container lid in a short time.
8. Does not require any adhesives to keep it in place relative to the closure of the container, yet is relatively easy to remove therefrom.
9. Has high resistance to water-soluble materials.

It is also among the objects of the invention to provide:
10. A process for forming gaskets by flowing a fluid having good viscoelastic properties onto the closure of the drum, pail or other container.
11. A process for forming a gasket in which curing of the gasket composition is effected substantially simultaneously with the application of the composition to the closure of the container.
12. A process which minimizes the need for long periods of post-curing at quite high temperatures.

SUMMARY OF THE INVENTION

Gasketing compositions comprising 25%–65% of synthetic rubber block copolymer and 75%–35% plasticizer are heated, mixed and applied, simultaneously with a curing agent to the lid or cover of a container such as a drum or pail while the latter is revolved. Corresponding apparatus is also described.

DESCRIPTION OF THE INVENTION

Figure 1:
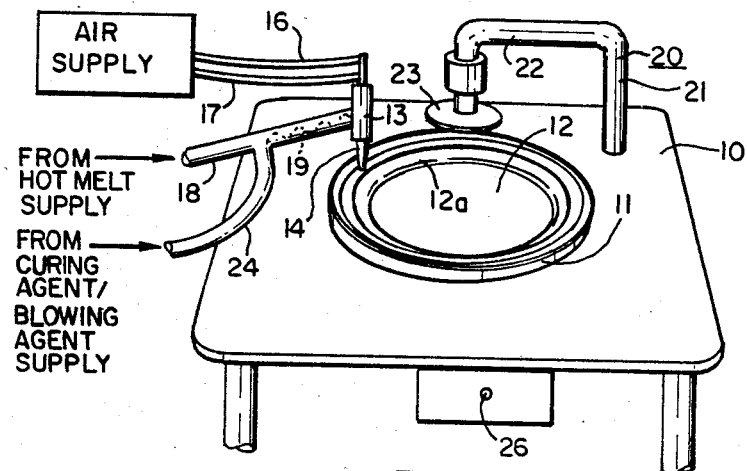
FIG. 1 is a perspective view of apparatus for forming the gasket in accordance with the present invention.
Figure 2:
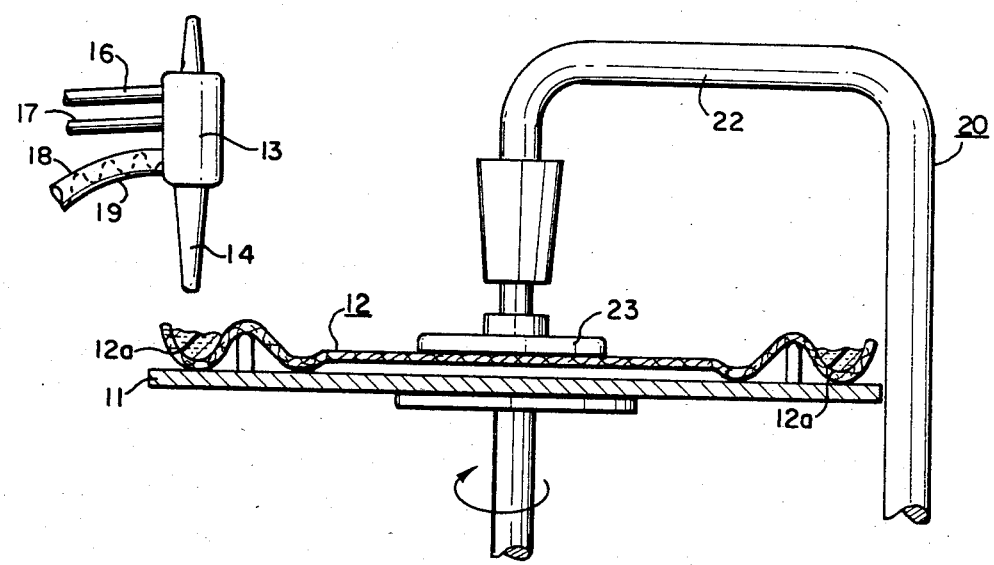
FIG. 2 is a side elevation, partly sectional of part of the apparatus shown in FIG. 1.

The present invention relates to a process for forming, in place, a gasket for the lids of drums or pails or the like, and products made from the process, as well as compositions of matter used in carrying out that process to produce a gasket product. In general, the compositions involve a synthetic rubber block copolymer and a plasticizer which are mixed together and flowed-on or otherwise applied to the lid or cover at a predetermined rate. In one embodiment of the invention, especially where the gasket product, in use, is to be subjected to more elevated temperatures, a vulcanizing or curing agent may be added to the gasket composition while or just before it is flowed onto the cover or lid.

The gasket compositions can be applied both to metal or fiber types and for pails which have plastic, metal or fiber covers.

It is important in formulating the mixtures which become the gasket compositions that the proper range of the synthetic rubber constituent be adhered to. Otherwise, if the percentage of the synthetic rubber copolymer is too great, the composition will become too viscous to flow at formable temperatures to form the gasket and to permit the ends of the flowed-on gasket material to merge into a homogeneous body. If the percentage of the synthetic rubber is too low relative to the percentage of the plasticizer, the plasticizer may exude from the gasket into the container and thereby may become unfit for the intended use.

For this invention, snythetic rubbers have been chosen in preference to natural rubber because the latter does not produce a satisfactory composition. Natural rubber is incapable of being plasticized to flow at low enough temperatures to permit obtaining a composition which has adequate flow characteristics for in-place application and to give adequate gasketing properties. Many sythetic rubbers are also similarly excluded.

In the preferred embodiment, compositions from 25% to 65% of a synthetic rubber block copolymer and from 75% to 35% plasticizer by weight are used to form, in place, a gasket on the lid or cover of a container such as a drum or pail. These ingredients are mixed under elevated temperatures until a homogeneous mass is obtained. The hot melt mixture is then applied to the lid or cover together with a curing agent which effects vulcanization of the mixture in place on the lid. In certain instances, as will be seen later, the curing agent may not be needed to produce an acceptable gasket.

The synthetic rubber(s) may be of the group comprising: styrene-butadiene-styrene (SBS rubber), styrene-isoprene-styrene (SIS rubber), or styrene-ethylene-butylene-styrene (S-EB-S rubber). Depending upon the desired viscosity of the composition, varying amounts of the ruber constituent(s), up to about 50% thereof by weight, may be replaced with butyl rubbers, ethylene-propylene rubbers, EPDM rubbers, styrene-ethylene or styrene-butylene rubbers.

In order to facilitage mixing, or adjust viscosity or other flow characteristics during formulation or to produce in the formed gasket certain desired properties such as the proper degree of hardness or tackiness, the plasticizer(s) is mixed with the synthetic rubber component(s) selected from a group comprising paraffin oils or waxes, polyethylene, polypropylene and ethyl vinyl alcohol. The paraffin oils are desirably less than 1% aromatic, have a viscosity greater than about 400 SUS and have a flash point greater than about 400° F.

If the gasket product is not, in use, to be subjected to temperatures in excess of about 150°-210° F., curing or vulcanization of the flowed-on mixture may not be needed. Where the end use will subject the gasket to temperatures above that range, however, curing may be effected by applying to the hot-melt mixture just before flowing it on in place, a curing agent selected from the group comprising a peroxide or an azo catalyst. The group may include, for example, benzoyl peroxide, dicumyl peroxide, ditertiary butyl peroxide, or azobisisobutyrl nitrile.

The compositions taught in the present invention are thermo-plastic during their application to the lid or closure and exhibit excellent consistency and flow. The final gasket product is also quite resistant to compression set and to exudation of any of its components, such as the plasticizer. The final gasket is also resistant to chemical change or extraction of any of its components by the contents of the container. With standard conventional gaskets, compression set is undesirably high at temperatures above 210° F. and the prior art required additional steps in processing to enhance the gasket's resiliency or flexibility. The present invention does not require these additional processing steps to achieve higher resistance of the gasket to compression set. The present invention also dispenses with the necessity for using cure of the gasket material by electron beam. This conventional type of curing is relatively expensive involving the use of expensive equipment and more labor. For gaskets for drums it is even possible that the gasket may be degraded by its use after using the hot-melt plus curing agent process described above.

Optionally, a blowing agent, filler, pigment or anti-sticking agent may be employed in formulating the composition. A suitable foaming or blowing agent such as nitrogen or carbon monoxide gas, or nitrogen-producing agents will produce a formed gasket. The use of azo as a curing and blowing agent and proper use of fillers will assist in producing a gasket product which has superior resistance to compression set than those gaskets known to the prior art. The present invention produces a gasket product that is resistant to compression set, exudation of the plasticizers and extraction by pail contents.

The following are examples of the formulas and processes used in preparing the hot melt for application to the lid or cover to make the plastic gasket product.

EXAMPLE 1

37 parts of Solprene 416 (Phillips) synthetic SBS rubber was mixed at 270° F. with 57 parts by weight of Sunpar 110 plasticizer (Sun) in any appropriate chemical mixer together with 6 parts of calcium carbonate as a filler. This heated mixture was applied together with 0.6 parts of a formulation of 50% benzoyl peroxide with a 50% calcium phosphate carrier (also at 270° F.) which helps to prevent flashing of the peroxide itself. To facilitate actual application of the peroxide, some of the parts of the Sunpar 110 are pre-mixed with it prior to applying the curing agent to the rubber and plasticizer components. This is done whenever benzoyl peroxide is used in the following examples.

EXAMPLE 2

20 parts Solprene 416, 15 parts Solprene 411, (SBS rubbers) 56 parts Sunpar 110 and 9 parts calcium carbonate filler were mixed together as in Example 1 and at the same temperature and in the same type of mixer although other mixers can be used as well. Then 0.6 parts of the same curing agent, benzoyl peroxide on a non-flashing carrier, were added at the same temperature as before.

EXAMPLE 3

20 parts of Solprene 416, 20 parts Kraton G1650 (a Shell SIS copolymer), 55 parts of Sunpar 110 and 5 parts of calcium carbonate were mixed together as before at the same temperatures and in the same type of equipment. 0.6 parts by weight of the benzoyl peroxide was added at the same temperature just prior to applying the mixture to the lid or cover, or a groove formed therein. Shell's Shel-flex 371 could be substituted for Sunpar 110 in about the same concentrations, i.e., 40-68 parts.

EXAMPLE 4

32 parts by weight of Kraton G1650 block copolymer (Shell) were mixed under the same temperatures with 68 parts of Britol 55P (Browler Petrochemical), a plasticizer, and 18 parts of calcium carbonate as well as 0.6 parts of the benzoyl peroxide curing agent were also applied at 270° F.

EXAMPLE 5

36 parts of Kraton G1650 were mixed with 52 parts of Sunpar, 12 parts of calcium carbonate and 0.6 parts of the same benzoyl peroxide curing agent, all at the same temperature as in the previous Examples.

EXAMPLE 6

28 parts of Kraton were mixed under the same elevated temperatures with 40 parts of Sunpar, 18 parts of Elvax 150 (Dupont), an ethyl vinyl alcohol, (a plasticizer), 14 parts of paraffin wax and 0.6 parts of the benzoyl peroxide curing agent. In formulating the composition, 5% of dibutyl phthalate may be used to increase the solubiliy of the Elvax. About 10% of polypropylene or polyethylene could be substituted for the paraffin wax for greater hardness of the gasket.

EXAMPLE 7

32 parts of Kraton, 68 parts of Sunpar and 0.6 parts of the same curing agent are processed in the same way as all of the above examples.

EXAMPLE 8

40 parts of Solprene 416, 60 parts of Sunpar 110 were mixed together under the same high temperatures. Then after mixing those completely, 2 parts of benzoyl peroxide were added at 270° F. and this cross-linked all of the other constituents. A variation would be to use, instead of the benzoyl peroxide, VUL-CUP curing agent (Hercules) in the same amount (2 parts).

EXAMPLE 9

40 parts Solprene 416, 60 parts Sunpar 110, 2 parts Hysil 233 silica as a filler were mixed in the usual fashion and then, at 270° F. benzoyl peroxide (2 parts), or at 300° F. 2 parts of VUL-CUP, were added which cross-linked the mixed-together components. The Hysil is an oil-acceptor which helps to prevent exudation of the plasticizer from the gasket.

EXAMPLE 10

The same ingredients and processing as in Example 9 except for the substitution of 10 parts of Solprene 411 for the Hysil 233. The Solprene imparts greater strength and resistance to compression set of the gasket product.

EXAMPLE 11

The same ingredients as in Example 9 except that 6 parts of Hysil 233 were used instead of 2 parts of Hysil. They were subjected to the same temperature and mixing as in Example 9.

Formulations such as those disclosed in Examples 1 through 7 have resulted in varying degrees of recovery from compression set as measured by ASTM 395, Method B, which involves heating at 100° F. for three hours. Examples 1-7 had recovery from compression set readings of 62%, 58%, 56%, 71%, 40%, 50% and 30%, respectively.

Examples 1, 2 and 3 had Shore A hardness numbers of 18, 21, and 16 respectively. Examples 5 and 6 had hardness numbers of 11 and 40 respectively.

Elongation characteristics for the first 6 Examples were 300%, 250%, 200%, 250%, 300%, and 150%, respectively.

Staining characteristics of kraft paper at −10° C. for Examples 1-6 were, respectively, slight, minimal, slight, non-staining, non-staining, and non-staining.

If desired, other components may be added to the hot-melt mix. For example, viscosity-reducing agents such as the monomer Saret 500 (Sartomer Resins), a trimethacrylate product, may be added in small quantities such as 0.6 to 1.2 parts. In addition, this monomer increases the hardness of the finishsed gasket product.

Other fillers or pigments may likewise be used as desired. Also, to improve the adhesion of the gasket to the lid, resins of the polyterpene class may be added to the hot-melt mix.

As required to produce a foamed gasket, blowing agents such as nitrogen or carbon dioxide may be resorted to.

Also, if desired, foaming or blowing agents such as Celogen OT may be employed in typical quantities of, say, 2.8 parts.

Apparatus and method suitable for forming a gasket product in accordance with present invention will now be explained. As shown in FIG. 1, a table 10 is shown on which there is affixed a mechanically rotatable turntable 11 on which a lid 12 is positioned. The turntable is rotated by an appropriate driving motor (not shown in the drawing) and may be moved vertically as well. A dispensing head 13 is disposed above the turntable close to its periphery. The nozzle portion 14 of the head 13 is positioned over a groove 15 formed in the lid 12. The head is connected by pipes or tubes 16, 17 and 18 to a pump (not shown) adapted as described below to supply the hot-melt gasket compositions to it.

A centering subassembly 20, which can be raised or lowered, may be mounted atop the table 10 for rotation in a generally horizontal plane in a manner similar to the mounting of the tone arm of a record player.

At the beginning of the gasketing operation, the turntable 11 is in a low position. The cover or lid 12 is placed on the turntable so that their centers coincide. Then the turntable is raised towards the nozzle 14 so that the groove 12a is below the nozzle.

The centering subassembly has a generally vertical member 21 which can be aligned with the center of rotation of the turntable. It has an arm 22 which has at its lower extremity a disc 23. The disc is mounted to arm 22 by a ball-bearing assembly so that the arm can exert downward pressure, via the disc, on the lid while the latter is being rotated by the turntable. The centering subassembly keeps the cover 12 firmly held during the gasket-forming stage so that it does not go off-center.

After the cover 12, which may be made of metal, plastic or fiber, is placed on the turntable, the turntable is raised, the centering arm is pivoted over the turntable and its disc is lowered into contact with the raised cover. The nozzle 14 and the motor for the turntable are connected to an appropriate timing circuit (not shown) which is triggered by a push button 26 or a foot pedal (not shown). When the button is pressed, the timing circuit turns on the motor and the nozzle only for the time required for the turntable to complete a single revolution which can be in as little as, for example, 2 seconds. By pressing the pushbutton, the turntable and nozzle are activated, and the turntable rotates for one complete revolution while the hot-melt gasket material is deposited into the groove. When the turntable stops, the centering arm is pivoted back out of the way of the lid or cover; the turntable is lowered. The lid is then removed and put aside while the gasket material sets at room temperature. The process may then be repeated on the next cover.

In the apparatus shown in FIG. 1, the dispensing head 13 including the nozzle 14 may be obtained from Pyles Industries. The head 13 includes, internally, an air-operated valve (not shown) which is open or shut by means of air pressure supplied through the two small tubes 16 and 17. This valve allows the hot-melt combination to flow through and out the nozzle 14.

The larger tube 18 has within it near its point of attachment to the head 13 a static mixing apparatus shown schematically at 19. Upstream of the mixer 19 another tube 24 is joined to and in communication with the tube 18. The tube 18 brings the hot-melt liquid from a convenational hot-melt application equipment, designed for adhesives or the like, such as the 55 gallon bulk-drum unloader distributed by Kent-Moore Pyles Industries, Inc. or by the Nordson Corporation. This apparatus has a heated subassembly which is dipped into a drum of the previously-mixed block copolymer-plasticizer as discussed above in connection with the various examples.

Through the tube 24, the catalyst or curing agent, as described above in connection with the various examples, and/or the blowing agent are supplied at the same approximate temperature as the hot-melt compositions.

At the dispensing head, the pressure of the combined liquid compositions is in the 40–80 pounds range with 60 pounds being the average. This contrasts sharply with plastic extruders wherein 1000 pounds per square inch is a common extruding pressure.

In one satisfactory set of operating conditions, the groove formed in the cover or lid had a circumference of approximately 67½ inches, and the nozzle applied somewhat more than 50 grams of gasket material for each revolution of the lid at a flow rate of about 350 pounds per hour. The groove itself had an approximate cross-section of 1¾ square inches.

After the gasket material is flowed into the groove, the lid is set aside to cool at room temperature for several minutes.

In some instances, to improve the resistance to compression set even more, the gasket so formed may be heated for two or three minutes at a temperature of about 325° F. This additional heating adds additional cross-linking to the deposited gasket material.

Gasket products of the type described herein are usually not permanently fused to the cover or to the groove in the cover. If the formed gasket product is unsatisfactory, it may be removed from the groove simply by peeling or stripping it therefrom with relatively little effort. A new gasket may then be formed on the cover or in the groove of the cover as explained above.

What is claimed is:

1. A method of forming a gasket on the lid or cover of a container such as a drum or pail or the like, comprising:
   (a) providing a hot-melt composition which comprises 25%–65% by weight of snythetic rubber copolymers mixed with 75%–35% of a plasticizer,
   (b) rotating said cover or lid,
   (c) applying said composition to said cover or lid while rotating, said rotation being at a speed low enough to prevent centrifugal force from causing dispersion of the applied composition, and
   (d) permitting said applied composition to set.

2. The method according to claim 1 wherein a curing composition is brought into contact with the first-named composition just prior to applying said first composition to said cover or lid.

3. The method according to claim 2 wherein said curing composition is selected from the group comprising a peroxide or an azo catalyst.

4. The method according to claim 3 wherein said peroxide is selected from the group comprising benzoyl peroxide, dicumyl peroxide, or ditertiary butyl peroxide.

5. The method according to claim 1 wherein there is a gasket-forming groove formed in said lid and wherein said composition is applied to said groove at about 40–80 pounds per square inch and at a temperature in the range of about 275°–325° F.

6. The process of forming, in place, a gasket for a container having a lid or the like, which comprises:
   (a) providing a hot fluid composition which comprises 25%–65% by weight of synthetic rubber copolymers mixed with 75%–35% of a plasticizer,
   (b) providing a curing composition for said (a) composition,
   (c) bringing said (a) and (b) compositions together, and
   (d) immediately applying said brought-together compositions to a predetermined portion of said lid or the like.

7. The process according to claim 1 with the addition of step (e) permitting said applied compositions to cool.

8. The process according to claim 6 wherein the application of said brought-together compositions is by flowing said last-named compositions onto said predetermined portion of the container.

9. The process according to claim 8 wherein said predetermined portion comprises a groove in said lid or the like.

10. The process according to claim 8 wherein said lid or the like is turned while said application of said brought-together compositions thereto is effected.

11. The process according to claim 8 wherein said application of said brought-together compositions is made while they are at a temperature in excess of about 275° F.

12. The process according to claim 6 wherein said synthetic rubber copolymer is selected from the group comprising styrene-butadiene-styrene rubber, styrene-isoprene-styrene rubber, or styrene-ethylene-butylene-styrene rubber.

13. The process according to claim 6 wherein up to about 50% by weight of said rubber content is replaced by rubber selected from the group comprising butyl rubbers, ethylene-propylene rubbers, EPDM rubbers, styrene-ethylene or styrene-butylene rubbers.

14. The process according to claim 6 wherein said plasticizer is selected from the group comprising paraffin oils or waxes, polyethylene, polypropylene and ethyl vinyl alcohol.

15. The process according to claim 14 wherein said paraffin oils or waxes have a SUS viscosity greater than about 400.

16. The process according to claim 14 wherein said paraffin oils or waxes have a flashpoint greater than about 400° F.

17. The process according to claim 14 wherein said paraffin oils or waxes are less than 1% aromatic.

18. The process according to claim 6 wherein said curing agent is selected from the group comprising a peroxide or an azo catalyst.

19. The process according to claim 18 wherein said peroxide is selected from the group comprising benzoyl peroxide, dicumyl peroxide, or ditertiary butyl peroxide.

20. The process according to claim 18 wherein said azo catalyst comprises azobisisobutyrl nitrile.

21. A method according to claim 1 wherein said applied composition is permitted to set at ambient temperature.

22. A method according to claim 7 wherein said applied composition is permitted to cool at ambient temperature whereupon a gasket is formed on said lid or the like.

23. A method according to claim 1 wherein the said step (c) is initiated while said cover or lid is at ambient temperature.

24. A method according to claim 23 wherein said step (c) is performed at ambient pressure.

25. A method according to claim 23 wherein said step (d) is performed at ambient pressure and no pressure is thereafter applied.

26. A method according to claim 21 wherein said composition is non-volatile.

27. A method according to claim 6 wherein said composition is non-volatile.

28. A method of forming a gasket on the lid or cover of a container such as a drum or pail or the like, comprising:

(a) providng a hot-melt composition which comprises 25%–65% by weight of synthetic rubber copolymers mixed with 75%–35% of a plasticizer, (b) applying said composition while imparting relative rotation between said lid or cover and the point where said applying occurs, said applying being at a speed such as not to cause substantial dispersion of said composition on said cover or lid subsequent to its coming into contact therewith, and (c) permitting said applied composition to set.

29. A method according to claim 1 wherein said composition sets by having its temperature lowered.

30. A method according to claim 1 wherein said copolymers are synthetic rubber block copolymers.

31. A method according to claim 6 wherein said copolymers are synthetic rubber block copolymers.

32. A method according to claim 1 wherein said gasket does not exude said plasticizer.

* * * * *